Sept. 27, 1927.  J. SZAKÁCS  1,643,861
TOOL
Filed Oct. 15, 1925   2 Sheets-Sheet 1
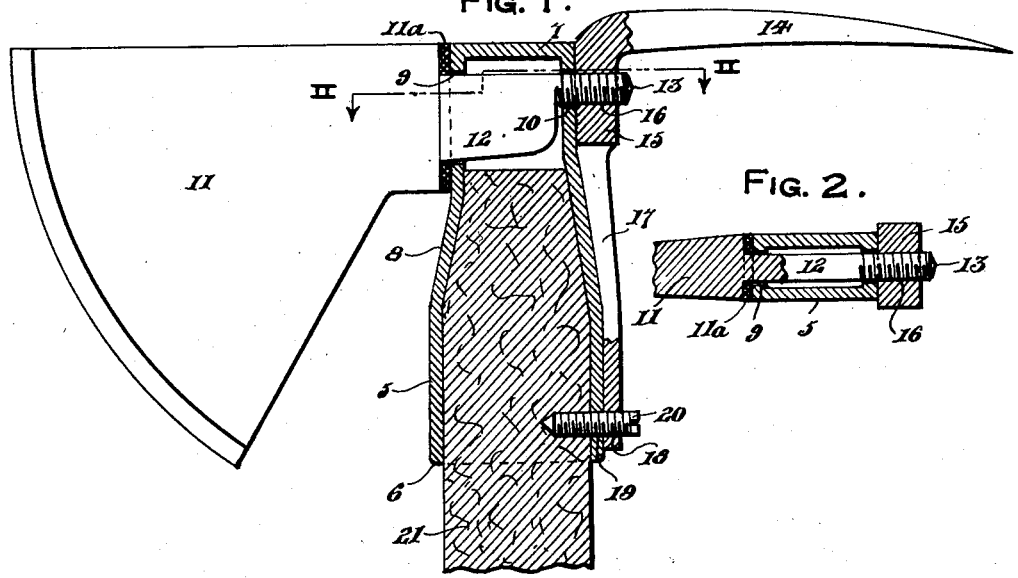
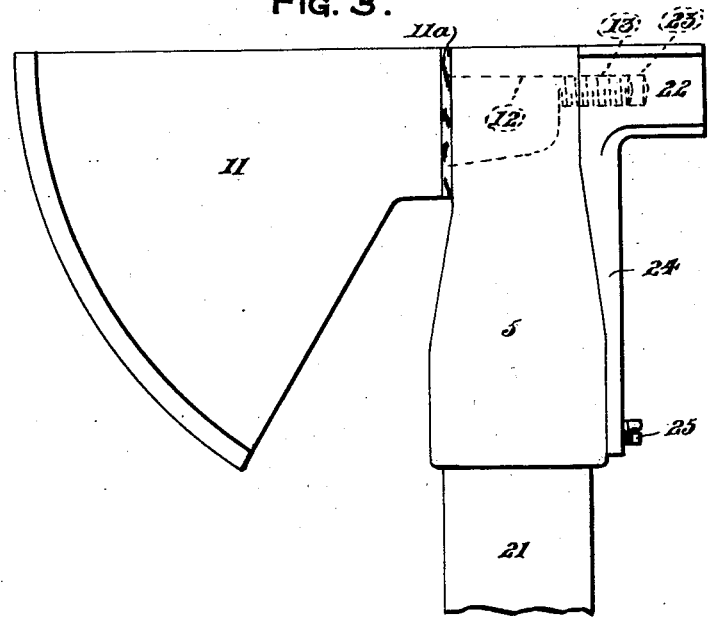
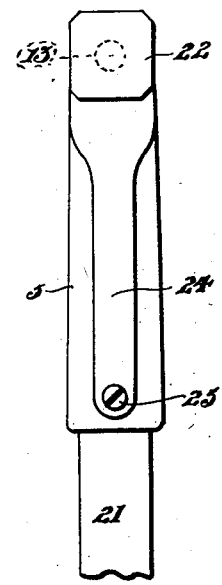

Sept. 27, 1927. 1,643,861
J. SZAKÁCS
TOOL
Filed Oct. 15, 1925   2 Sheets-Sheet 2
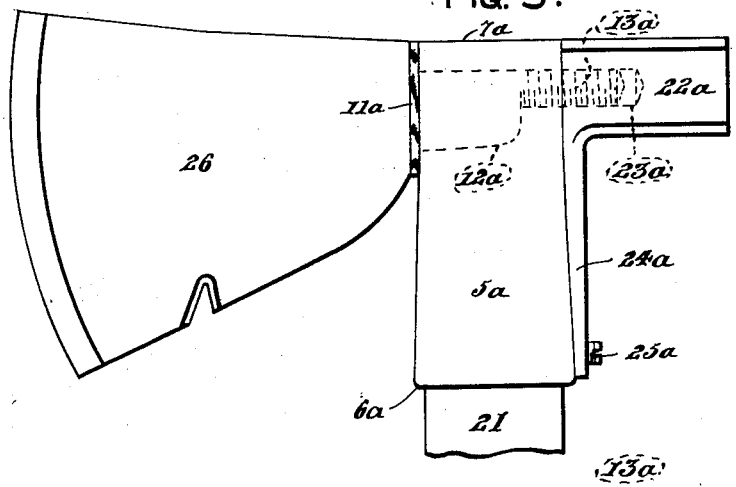
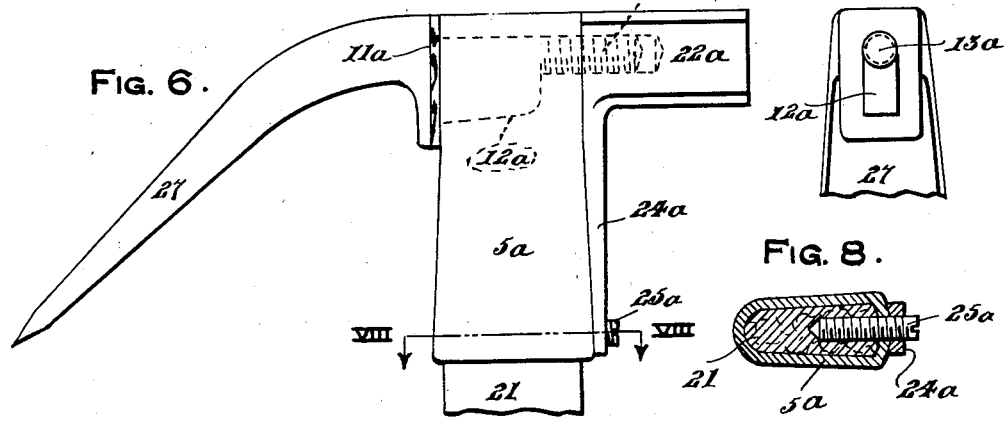
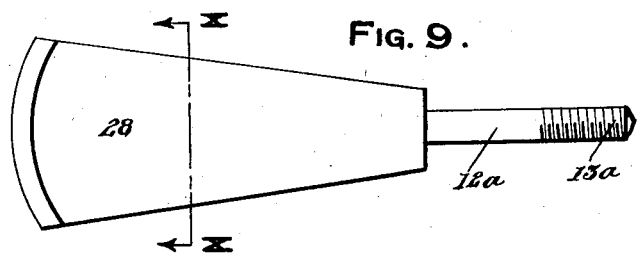
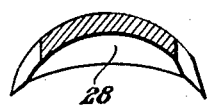
Inventor
J. Szakacs
By Bryant & Lowry
Attorneys

Patented Sept. 27, 1927.

1,643,861

UNITED STATES PATENT OFFICE.

JOSEPH SZAKÁCS, OF WOOD, PENNSYLVANIA, ASSIGNOR OF ONE-THIRD TO NICHOLAS GENSIOR, OF WOOD, PENNSYLVANIA, AND ONE-THIRD TO W. IRA EVANS, OF BROAD TOP, PENNSYLVANIA.

TOOL.

Application filed October 15, 1925. Serial No. 62,608.

This invention relates to new and useful improvements in tools.

The primary object of the invention is to provide a tool head to which may be attached many different types of cutting blades, or the like which are held in place by means that also function to connect a handle portion to the head.

Other objects and advantages of the invention will be apparent during the course of the following description.

In the accompanying drawings forming a part of this specification and in which like numerals are employed to designate like parts throughout the same, Figure 1 shows partly in elevation and partly in section a tool embodying this invention, Figure 2 is a transverse sectional view taken upon line II—II of Fig. 1, Figure 3 is a side elevational view of a slightly modified form of tool, Figure 4 is an elevational view taken at right angles to Fig. 1, Figure 5 is a side elevational view of a further modification of the type of tool embodying this invention, Figure 6 is a side elevational view of a still further form of tool, Figure 7 shows in elevation a detachable blade embodying this invention, Figure 8 is a transverse sectional view taken upon line VIII—VIII of Fig. 6, Figure 9 is a detail plan view of a detachable cutting blade embodying this invention, and Figure 10 is a transverse sectional view taken upon line X—X of Fig. 9.

In the drawings, wherein for the purpose of illustration is shown a preferred embodiment of this invention, the numeral 5, in Figs. 1 to 4 inclusive, designates a hollow tool head or shell which is open at its inner end 6 and closed at its outer end 7. The opposite end portions of this head are of different diameters and are connected by the reducing portion 8. The outer end 7 of this hollow head 5 is spaced from the end of the tool handle 21 and is provided with a rectangular opening 9 in one side thereof while the opposite side is formed with a reduced circular opening 10.

The reference character 11 designates the blade portion of a cutting tool which has a shank 12, of rectangular formation in cross-section, projecting therefrom. This shank 12 is provided with a threaded stem 13 that extends longitudinally of the shank from the free end of the same. In connecting the blade 11 to the hollow tool head 5, the rectangularly-shaped head 12 is inserted through the rectangular opening 9 in the outer end of the hollow head and a cushion washer 11ª is interposed between the adjacent faces of the blade 11 and head 5. The threaded stem 13 of the shank 12 extends through the circular opening 10 of the head and projects outwardly thereof. The head 12 being positioned in the hollow head between the outer end 7 of the same and the end of the handle tends to strengthen the hollow head or shell to provide a substantial construction.

A cutting blade 14 is provided with a shank or base 15 which is apertured at 16, the aperture being internally screw-threaded. This shank or base 15 is arranged with the threaded stem 13 of the blade 11 alined with the threaded aperture 16 and the shank or base 15 is located for tightening the same upon the stem 13. This rotating of the shank or base 15 will tightly lock the shank 12 in place, as illustrated with the base 15 engaged with the hollow head. To prevent loosening of the shank or base 15 upon the stem 13, the former is provided with an arm 17 which extends longitudinally of the head 15 and is apertured at its free end, as at 18. The wall of the hollow head 5 is also apertured at 19, in register with the aperture 18, and a screw 20 is inserted through these apertures 18 and 19, the arm 17 being shaped to engage the hollow head throughout its length. The hollow head 5 is also provided with a wooden, or other composition, handle 21 which is inserted into the head through its open end 6. Figure 1 clearly shows that the set screw 20 also functions to hold the handle 21 within the bore of the hollow head 5.

Figures 3 and 4 show a slightly different combination in that the cutting blade 14 is dispensed with and a striking head 22 is substituted for the same. This striking head is formed with an internally threaded bore 23 which receives the stem 13 of the shank 12 and tightly draws and holds the cutting blade 11 in its operative position in respect to the head 5. This striking head 22 is also provided with an arm 24 which extends longitudinally of the head 5 and is held against movement by the set screw 25 which also functions, as illustrated in Fig. 1, to hold the handle 21 within the bore of the head 5.

In Figs. 5, 6 and 8, the tool head 5ª is of slightly different design to the design of the head 5 as it gradually tapers from its open end 6ª to its closed end 7ª. In Fig. 5 the head is illustrated as having connected thereto a cutting blade 26 which carries a rectangularly-shaped shank 12ª having a threaded stem 13ª. This cutting blade 26 is held in place by a striking head 22ª which has a threaded bore 23ª. The head 22ª carries an arm 24ª which extends longitudinally of the head 5ª and is held against movement by the set screw 25ª.

In Figs. 6 and 7 a further form of cutting blade 27 is illustrated, however, this blade is also provided with a shank 12ª and a threaded stem 13ª. The same striking head 22ª is associated with this cutting blade 27. Figures 5 and 6 also illustrate the blades 26 and 27 as having cushion washers 11ª interposed between the adjacent faces of the blades and the head 5ª.

In Figs. 9 and 10 a further modified form of cutting blade 28 is illustrated, the same being curved transversely. This blade is also provided with a shank 12ª and a threaded stem 13ª.

It will now be seen that applicant has provided a combination tool which includes two different active portions which are connected together in a manner to hold the same connected to the tool head illustrated. To prevent the loosening or unintentional disconnection of the different active portions of any of the combination tools illustrated, one active portion of each combination tool is provided with an arm which is secured to the head in a manner to prevent movement of that active portion which would cause the two active portions to become disconnected. This connecting means between the arm and the tool head also functions to connect a handle to the head.

It is to be understood that the forms of this invention herewith shown and described are to be taken as preferred examples of the same, and that various changes in the shape, size, and arrangement of parts may be resorted to without departing from the spirit of the invention or the scope of the subjoined claim.

Having thus described the invention, I claim:—

In a tool, a handle, a hollow head mounted thereon with the closed end of the hollow head spaced from the enclosed end of the handle, opposite sides of the hollow head outwardly of the handle having openings therein, a tool at each side of the hollow head, one of said tools having a head portion received in the outer end of the hollow head through one of the openings and substantially filling the space between the handle end and the closed outer end of the hollow head, a screw stud projecting from the edge portion of the tool and extending through the other opening in the hollow head, the other tool having a base portion threaded on the stud screw into engagement with the hollow head, and an arm carried by the base portion of the last named tool extending longitudinally of and engaged with the hollow head with a fastening device passing through the arm and hollow head and entering the handle.

In testimony whereof I affix my signature.

JOSEPH SZAKÁCS.